May 2, 1950              J. H. YOOS              2,506,406
CIRCULAR SAW SETTING MACHINE
Filed March 3, 1949              2 Sheets-Sheet 1
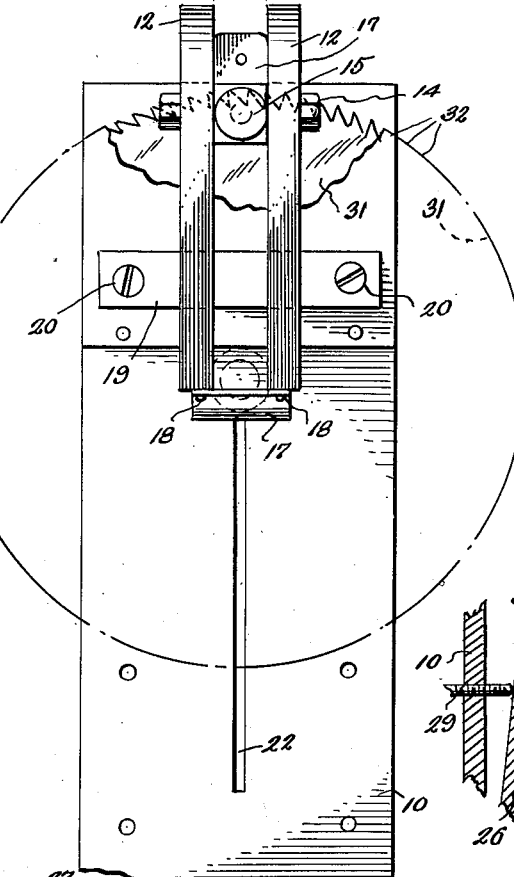
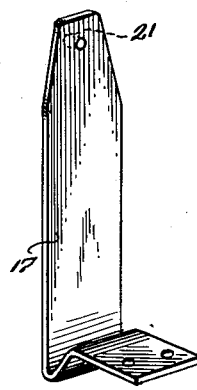
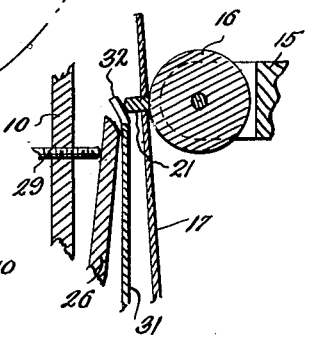
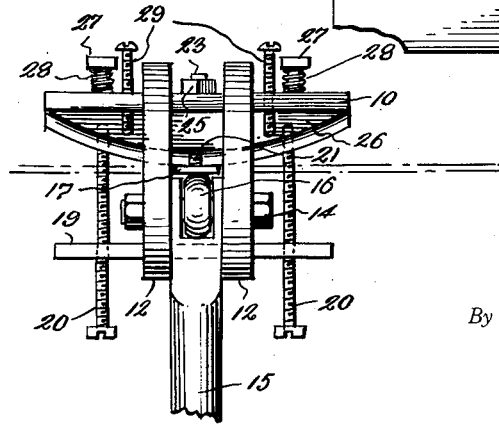
Inventor
JESSE H. YOOS
By Patrick J. Beavers
Attorney May 2, 1950 J. H. YOOS 2,506,406
CIRCULAR SAW SETTING MACHINE
Filed March 3, 1949 2 Sheets-Sheet 2
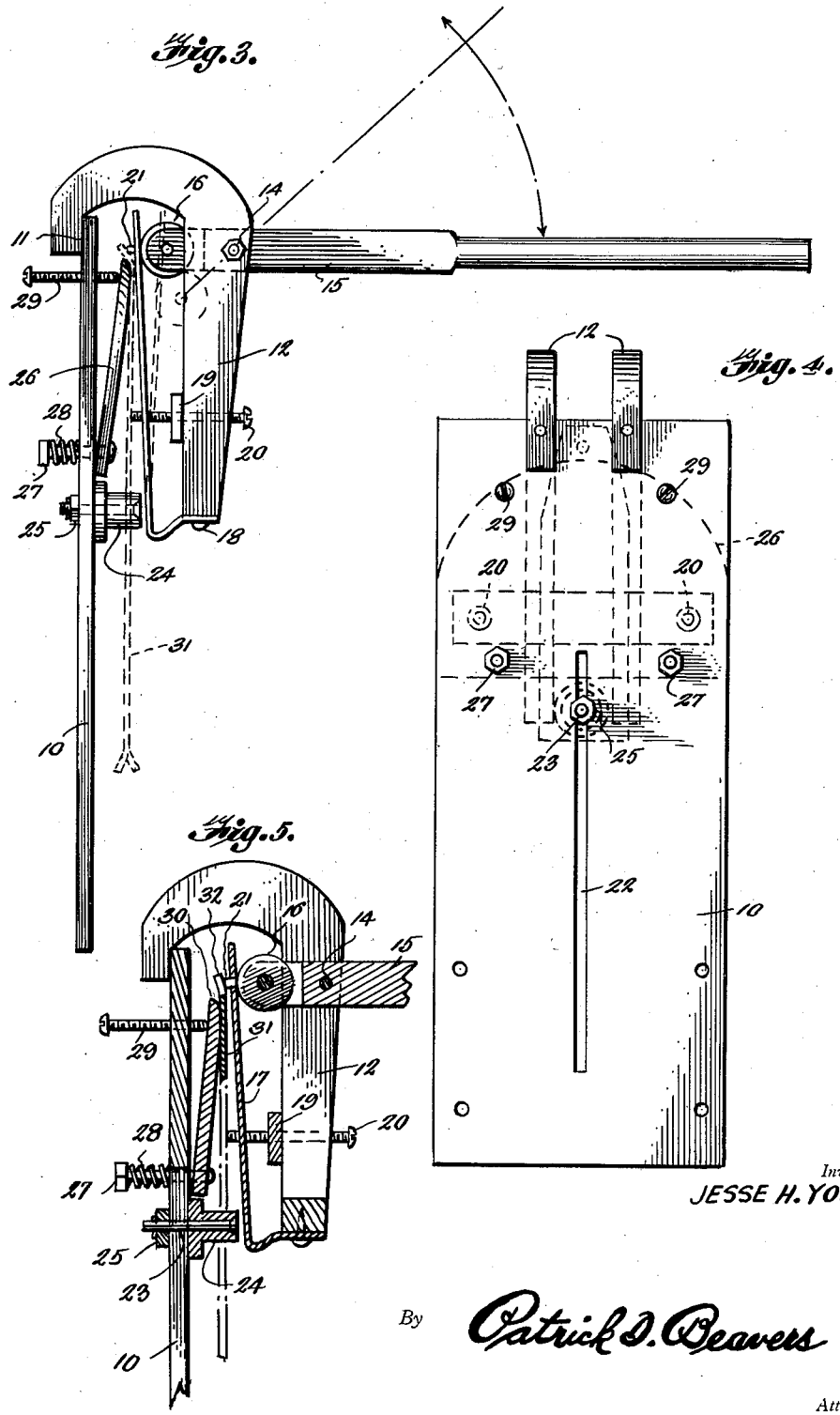
Inventor
JESSE H. YOOS
By Patrick D. Beavers
Attorney Patented May 2, 1950

2,506,406

UNITED STATES PATENT OFFICE 2,506,406

CIRCULAR SAW SETTING MACHINE

Jesse H. Yoos, McCook, Nebr.

Application March 3, 1949, Serial No. 79,378

4 Claims. (Cl. 76—63)

The present invention relates to a circular saw setting machine and it consists in the combinations, constructions and arrangements of parts herein described and claimed.

Generally there is provided a saw setting machine for circular saws into which a circular saw may be positioned accurately and thereafter revolved in step by step relation and wherein a single movement of a handle forming a part of the invention will cause the proper setting of a tooth of the saw. When alternate teeth of a saw have been set in one direction, the saw may be quickly and easily removed from the device and after reversing the same may be again placed therein whereupon the untreated teeth may be set in the other direction in the manner aforesaid. Simple and novel means are provided for adjusting the initial position of the machine and for quickly and easily setting up the working parts of the device whereby an exact angle may be imparted to the teeth of the saw.

It is accordingly an object of the invention to provide a device of the character set forth which is simple in its construction and operation and yet effective and efficient in use.

Another object of the invention is the provision of an inexpensive device of the character set forth which is peculiarly adaptable to the setting of the teeth of circular saws.

Another object of the invention is the provision of a novel adjustable spindle for the mounting of a circular saw in a device of the character set forth.

Another object of the invention is the provision of a novel backing plate forming a part of the invention.

A further object of the invention is the provision of novel adjusting means throughout the apparatus forming the present invention.

Other and further objects of the invention will become apparent from a reading of the following specification taken in conjunction with the drawings, in which:

Figure 1 is a front elevational view of an embodiment of the invention,

Figure 2 is a fragmentary plan view of Figure 1,

Figure 3 is a side elevational view of Figure 1,

Figure 4 is a rear elevational view of the device shown in Figures 1 to 3, inclusive, Figure 5 is an enlarged fragmentary sectional view illustrating certain details of construction, Figure 6 is a perspective view of an element of the invention, and Figure 7 is a fragmentary sectional view illustrating the action of the apparatus.

Referring more particularly to the drawings, there is shown therein a base plate 10 of generally rectangular form to the upper rear face of which is affixed by means of welding, as indicated at 11, or through other conventional means a pair of arms 12 which extend over the top of the plate 10 in a generally arcuate direction and thence downwardly in parallel relation with the front of the plate 10.

At the upper portion of the forward part of the arms 12 a bolt 13 extends laterally through such arms and has pivoted thereon an operating handle 15 the inner end of which is provided with a roller 16 which is adapted to bear against a flat spring 17 at the free end thereof. The lower end of the spring 17 is affixed to the lower ends of the arms 12 by means of screws 18 or the like.

A laterally extending bar 19 is affixed by welding to the inner faces of the arms 12 and has threaded therein, adjacent each end thereof an adjustment screw 20.

On that side of the spring 17 facing the front of the plate 10 and adjacent the upper or free end thereof, the spring 17 is provided with a saw tooth engaging die member 21. The plate 10 is provided with a vertically extending centrally disposed slot 22 through which extends a bolt 23 and the inner end of which is provided a collar 24 and the outer end of which is provided with a nut 25 whereby the same may be locked in adjusted position in the slot 22.

An adjustable backing plate 26 is loosely mounted upon a pair of bolts 27 which extend through the plate 10 and which are each provided with tension springs 28 which bear against the back side of the plate 10 and against the head of the bolts 27. An adjustment screw 29 extends through the plate adjacent either side thereof and the screws 29 are adapted to bear against the upper extremity of the backing plate 26. The upper edge of the backing plate 26 is provided with a rounded contour 30.

In operation, it will be apparent that a circular saw 31 will first be placed upon the collar 24 after which the collar 24 and the saw will be moved upwardly to a position where the teeth 32 of the saw may be contacted by the die 21. At this time the handle 15 is moved to the position shown in the Figure 3, that is to say, in a position where it is at a right angle to the base 10. The screws 29 are then threaded inwardly of the plate 10 thus causing the backing plate 26 to bear against the saw 31 until the same is pressed tightly thereagainst. The handle 15 is then moved either upwardly or downwardly to release the pressure of the roller 16 from the spring 17 and the screws 29 are then turned inwardly one complete turn. The adjusting screws 20 are now threaded inwardly of the arms 12 until they fit snugly against the outer face of the saw 31. The bolt 33 is then left in this position and it will be seen that movement of the handle 15 to horizontal position will cause the die 21 to bend the saw tooth 32 to proper angular position, the angular upper edge of the backing plate 26 being of service in this connection. As each alternate tooth is bent thusly, the saw 31 may be rotated upon the collar 24 until the next alternate tooth is in position for such bending. When all of the alternate teeth have been so set, the saw may be removed from the apparatus and then turned over and replaced whereupon the teeth formerly untreated may be set in the manner above described.

While but one form of the invention has been shown and described herein, it will be readily apparent to those skilled in the art that many minor modifications may be made herein without departing from the spirit of the invention or the scope of the appended claims.

What is claimed is:

1. A device of the character described comprising a base plate having a centrally disposed longitudinally extending slot therein, a pair of arms affixed to one end of said base plate and having their free ends in parallel relation to said base plate, a flat spring affixed to the free ends of the arms and extending between the arms and the base plate, a die affixed to the spring adjacent the free end thereof and extending toward the base plate, a bolt adjustably mounted in said slot, a collar mounted on said bolt, a backing plate yieldably connected at one end with said base plate, adjustment screws threadably extending through the base plate and having abutment against the backing plate adjacent the free end thereof, a cross bar affixed to the inner ends of the arms adjacent the free ends thereof, adjustment screws threadably extending through the bars adjacent each end thereof, a handle pivotally carried by the arms and a roller mounted on the inner end of the handle and adapted to bear against the free end of the spring.

2. A device of the character described comprising a base plate having a centrally disposed longitudinally extending slot therein, a pair of arms affixed to one end of said base plate and having their free ends in parallel relation to said base plate, a flat spring affixed to the free ends of the arms and extending between the arms and the base plate, a die affixed to the spring adjacent the free end thereof and extending toward the base plate, a bolt adjustably mounted in said slot, a collar mounted on said bolt, a backing plate yieldably connected at one end with said base plate, adjustment screws threadably extending through the base plate and bearing against the backing plate adjacent the free end thereof, a cross bar affixed to the inner ends of the arms adjacent the free ends thereof, adjustment screws threadably extending through the bars adjacent each end thereof, a handle pivotally carried by the arms and a roller mounted on the inner end of the handle and adapted to bear against the free end of the spring, said backing plate having its free edge formed in a rounded contour to receive a saw tooth when bent by said die.

3. A device of the character described comprising a base plate, means for adjustably and revolubly mounting a circular saw on said base plate, a backing plate adjustably and yieldably carried by said base plate, a saw tooth bending die, means for normally holding said die out of engagement with a saw mounted on said base plate and means for forcibly moving said die into engagement with said saw, said means for holding the die out of engagement comprising a pair of arms affixed to the base plate and a flat spring carrying said die adjacent its free end and affixed to said arms at its other end.

4. A device of the character described comprising a base plate, means for adjustably and revolubly mounting a circular saw on said base plate, a backing plate adjustably and yieldably carried by said base plate, a saw tooth bending die, means for normally holding said die out of engagement with a saw mounted on said base plate and means for forcibly moving said die into engagement with said saw, said means for holding the die out of engagement comprising a pair of arms affixed to the base plate and a flat spring carrying said die adjacent its free end and affixed to said arms at its other end and said means for moving the die into engagement with said saw comprising a handle pivotally mounted on said arms and a roller mounted at the inner end of said handle.

JESSE H. YOOS.

REFERENCES CITED

The following references are of record in the file of this patent:

UNITED STATES PATENTS

| Number | Name | Date |
|---|---|---|
| 471,641 | Ivey | Mar. 29, 1892 |
| 589,267 | Neidhardt | Aug. 31, 1897 |
| 611,713 | Skersick | Oct. 4, 1898 |
| 1,482,780 | Bugge | Feb. 5, 1924 |
| 2,336,761 | Upright | Dec. 14, 1943 |